United States Patent
Dimnik et al.

(10) Patent No.: US 12,267,885 B2
(45) Date of Patent: Apr. 1, 2025

(54) KNOWN CELL DEFINITION WITH BEAMFORMING

(71) Applicant: Nokia Technologies Oy, Espoo (FI)

(72) Inventors: Riikka Dimnik, Helsinki (FI); Lars Dalsgaard, Oulu (FI); Yueji Chen, Hangzhou (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 568 days.

(21) Appl. No.: 17/431,048

(22) PCT Filed: Feb. 15, 2019

(86) PCT No.: PCT/CN2019/075164
§ 371 (c)(1),
(2) Date: Aug. 13, 2021

(87) PCT Pub. No.: WO2020/164091
PCT Pub. Date: Aug. 20, 2020

(65) Prior Publication Data
US 2022/0201567 A1    Jun. 23, 2022

(51) Int. Cl.
*H04W 76/10*    (2018.01)
*H04W 16/28*    (2009.01)
(Continued)

(52) U.S. Cl.
CPC ........... *H04W 76/10* (2018.02); *H04W 16/28* (2013.01); *H04W 36/0058* (2018.08);
(Continued)

(58) Field of Classification Search
CPC ... H04W 36/00837; H04W 36/008375; H04W 36/00838; H04W 76/10; H04W 36/0058;
(Continued)

(56) References Cited

U.S. PATENT DOCUMENTS

2021/0266134 A1*  8/2021  Axmon ................. H04L 5/0092
2022/0303811 A1*  9/2022  Kakishima ............ H04W 24/10

FOREIGN PATENT DOCUMENTS

| CN | 108886725 A | 11/2018 |
| CN | 109257957 A | 1/2019 |
| WO | 2018/127264 A1 | 7/2018 |

OTHER PUBLICATIONS

Qualcomm Incorporated: "Definition of know cell in FR2", 3GPPRAN4#AH1801, R4-1800923 PSCell Addition/Release/Change and SCell (de)Activation (38.133/36.133). San Diego, US, Jan 22-26. (Year: 2018).*

(Continued)

*Primary Examiner* — Chi H Pham
*Assistant Examiner* — Samuel Dilan Rutnam
(74) *Attorney, Agent, or Firm* — SQUIRE PATTON BOGGS (US) LLP

(57) ABSTRACT

Embodiments of the present disclosure provide methods, devices and computer readable media for communication. In an aspect, a method for communication comprises receiving, at a terminal device, from a network device an indication for the terminal device to establish a connection with a target cell. The method also comprises determining a condition as to whether the target cell and a transmit beam of the target cell for the terminal device are known to the terminal device. The method also comprises determining, based on the condition, a delay for the terminal device to establish the connection. The method further comprises establishing the connection within the delay. The embodiments of the present disclosure can improve communication performance of a terminal device.

20 Claims, 4 Drawing Sheets

(51) Int. Cl.
   *H04W 36/00* (2009.01)
   *H04W 36/08* (2009.01)
   H04W 36/24 (2009.01)
(52) U.S. Cl.
   CPC ..... *H04W 36/0061* (2013.01); *H04W 36/087* (2023.05); *H04W 36/249* (2023.05)
(58) Field of Classification Search
   CPC . H04W 16/28; H04W 36/0061; H04W 36/24; H04W 36/08
   See application file for complete search history.

(56) References Cited

OTHER PUBLICATIONS

U.S. Appl. No. 62/689,589, filed Jun. 25, 2018, Axmon; Joakim.*
Office action received for corresponding Chinese Patent Application No. 201980091793.3, dated Jul. 20, 2023, 3 pages of office action and no page of translation available.
Extended European Search Report received for corresponding European Patent Application No. 19914874.3, dated Sep. 21, 2022, 12 pages.
"Further discussion on handover requirements for NR", 3GPP TSG-RAN4 Meeting #87, R4-1806340, Agenda: 7.10.8.1, Intel Corporation, May 21-25, 2018, pp. 1-3.
"Discussion on NR PSCell addition delay in FR2", 3GPP TSG-RAN WG4 Meeting #89, R4-1815854, Agenda: 7.11.7.4, Nokia, Nov. 12-16, 2018, 3 pages.
"Handover to known FR2 cell", 3GPP TSG-RAN4 Meeting #90bis, R4-1904501, Agenda: 6.10.5.1.2, Nokia, Apr. 8-12, 2019, 4 pages.
Office action received for corresponding Chinese Patent Application No. 201980091793.3, dated Oct. 20, 2022, 6 pages of office action and no page of translation available.
"3rd Generation Partnership Project; Technical Specification Group Radio Access Network; NR; Requirements for support of radio resource management (Release 15)", 3GPP TS 38.133, V15.3.0, Sep. 2018, pp. 1-136.
"3rd Generation Partnership Project; Technical Specification Group Radio Access Network; Evolved Universal Terrestrial Radio Access (E-UTRA); Requirements for support of radio resource management (Release 15)", 3GPP TS 36.133, V15.4.0, Sep. 2018, 3228 pages.
"WF on known cell condition for handover FR2", 3GPP TSG-RAN WG4 RAN#89, R4-1816672, Agenda: 7.11.5.2, Nokia, Nov. 12-16, 2018, 4 pages.
"Discussion on NR SCell activation delay requirement in FR1", 3GPP TSG-RAN WG4 Meeting #86bis, R4-1803682, Agenda: 7.9.10.3, MediaTek Inc, Apr. 16-20, 2018, 5 pages.
"Further discussion on Scell activation and deactivation requirements", 3GPP TSG-RAN4 Meeting #86bis, R4-1803710, Agenda: 7.9.10.3, CATT, Apr. 16-20, 2018, 5 pages.
"Definition of known and unknown cells in FR1 and FR2", 3GPP TSG RAN WG4 Meeting #86bis, R4-1805093, Agenda: 7.9.5, Ericsson, Apr. 16-20, 2018, pp. 1-2.
"Discussion on NR SCell known condition", 3GPP TSG-RAN WG4 Meeting #86bis, R4-1805143, Agenda: 7.9.5, Nokia, Apr. 16-20, 2018, 3 pages.
"Discussion on NR SCell known condition", 3GPP TSG-RAN WG4 Meeting #87, R4-1807894, Agenda: 7.10.5, Nokia, May 21-25, 2018, 3 pages.
"CR on NR PSCell addition and release delay", 3GPP TSG-RAN4 Meeting #87, R4-1806707, CATT, May 21-25, 2018, 3 pages.
"Further discussion on Scell activation and deactivation requirements", 3GPP TSG-RAN4 Meeting #87, R4-1806706, Agenda: 7.10.10.5, CATT, May 21-25, 2018, 5 pages.
"CR on TS38.133 for Scell activation delay", 3GPP TSG-RAN WG4 Meeting #87, R4-1807342, Huawei, May 21-25, 2018, 3 pages.
"CR to 36.133 on NR PSCell addition and release delay", 3GPP TSG-RAN4 Meeting AH#1807, R4-1808690, CATT, Jul. 2-6, 2018, 3 pages.
"CR on TS36.133 for NR PSCell addition delay", 3GPP TSG-RAN WG4 Meeting #AH1807, R4-1808919, MediaTek Inc, Jul. 2-6, 2018, 3 pages.
"CR on NR PSCell addition Delay", 3GPP TSG-RAN WG4 Meeting #AH1807, R4-1809210, Nokia, Jul. 2-6, 2018, 3 bages.
"CR on SCell activation requirements in FR2", 3GPP TSG-RAN4 Meeting AH#1807, R4-1809546, CATT, Jul. 2-6, 2018, 3 pages.
"CR on NR SCell Activation Delay", 3GPP TSG-RAN WG4 Meeting #88, R4-1811029, Nokia, Aug. 20-24, 2018, 3 pages.
"CR to 36.133 on NR PSCell addition and release delay", 3GPP TSG-RAN4 Meeting #88, R4-1810252, Mediatek Inc, Aug. 20-24, 2018, 3 pages.
"SCell activation and deactivation", 3GPP TSG-RAN WG4 Meeting #88bis, R4-1812695, Nokia, Oct. 8-12, 2018, 3 pages.
"SCell activation and deactivation", 3GPP TSG-RAN WG4 Meeting #89, R4-1815853, Nokia, Nov. 12-16, 2018, 3 pages.
"On handover requirements for FR2", 3GPP TSG-RAN WG4 Meeting #89, R4-1815827, Agenda: 7.11.5.2, Nokia, Nov. 12-16, 2018, 2 pages.
"3rd Generation Partnership Project; Technical Specification Group Radio Access Network; NR; Base Station (BS) radio transmission and reception (Release 15)", 3GPP TS 38.104, V15.4.0, Dec. 2018, pp. 1-208.
"3rd Generation Partnership Project; Technical Specification Group Radio Access Network; NR; Radio Resource Control (RRC) protocol specification (Release 15)", 3GPP TS 38.331, V15.4.0, Dec. 2018, pp. 1-474.
International Search Report and Written Opinion received for corresponding Patent Cooperation Treaty Application No. PCT/CN2019/075164, dated Nov. 7, 2019, 9 pages.
"Definition of known cell in FR2", 3GPP RAN4#AH1801, R4-1800923, Agenda: 4.6.14, Qualcomm Incorporated, Jan. 22-26, 2018, 2 pages.
Communication pursuant to Article 94(3) EPC dated Jun. 4, 2024 corresponding to European Patent Application No. 19914874.3.
European Communication pursuant to Article 94(3) EPC, corresponding to EP Application No. 19 914 874.3, dated Dec. 20, 2024.

* cited by examiner

KNOWN CELL DEFINITION WITH BEAMFORMING

RELATED APPLICATION

This application was originally filed as PCT Application No. PCT/CN2019/075164, filed on Feb. 15, 2019, of which is incorporated herein by reference in its entirety.

FIELD

Embodiments of the present disclosure generally relate to wireless communication, and in particular, to a known cell definition with beamforming.

BACKGROUND

In the third generation partnership project (3GPP) radio access network (RAN) 4 specifications, for example, technical specification (TS) 36.133 and TS 38.133, a condition for a known cell has been defined. This definition is used, for example, in delay requirements for performing handover, secondary cell (SCell) activation and primary secondary cell (PSCell) addition, or the like. If a cell is known, the delay requirement for a terminal device is defined to be relatively low, because the terminal device does not need to do cell detection but only needs to confirm the presence of the cell. In case that a cell is unknown, the delay requirement for the terminal device is higher because cell detection is assumed to be necessary.

In general, whether a cell is considered as known or unknown depends on the duration since a terminal device measures and/or reports a cell to a network device until the network device instructs the terminal device to establish a connection with the cell. The reasoning behind such an approach is based on whether the terminal device is expected to have sufficient and accurate timing information on the cell. However, existing definitions in different scenarios for a known cell do not take into account transmit beamforming of the network device or receive beamforming of the terminal device. In other words, there is no feasible definition for a known cell if either or both of the network device and the terminal device are capable of beamforming.

SUMMARY

In general, example embodiments of the present disclosure provide a solution related to a known cell definition with beamforming.

In a first aspect, there is provided a method for communication. The method comprises receiving, at a terminal device, from a network device an indication for the terminal device to establish a connection with a target cell. The method also comprises determining a condition as to whether the target cell and a transmit beam of the target cell for the terminal device are known to the terminal device. The method also comprises determining, based on the condition, a delay for the terminal device to establish the connection. The method further comprises establishing the connection within the delay.

In a second aspect, there is provided a method for communication. The method comprises transmitting, from a network device, to a terminal device an indication for the terminal device to establish a connection with a target cell. The method also comprises determining a delay for the terminal device to establish the connection, based on a condition as to whether the target cell and a transmit beam of the target cell for the terminal device are known to the terminal device. The method further comprises monitoring whether the terminal device establishes the connection within the delay.

In a third aspect, there is provided a terminal device. The terminal device comprises at least one processor and at least one memory storing computer program code. The at least one memory and the computer program code are configured to, with the at least one processor, cause the terminal device to receive, from a network device, an indication for the terminal device to establish a connection with a target cell. The at least one memory and the computer program code are also configured to, with the at least one processor, cause the terminal device to determine a condition as to whether the target cell and a transmit beam of the target cell for the terminal device are known to the terminal device. The at least one memory and the computer program code are also configured to, with the at least one processor, cause the terminal device to determine, based on the condition, a delay for the terminal device to establish the connection. The at least one memory and the computer program code are further configured to, with the at least one processor, cause the terminal device to establish the connection within the delay.

In a fourth aspect, there is provided a network device. The network device comprises at least one processor and at least one memory storing computer program code. The at least one memory and the computer program code are configured to, with the at least one processor, cause the network device to transmit, to a terminal device, an indication for the terminal device to establish a connection with a target cell. The at least one memory and the computer program code are also configured to, with the at least one processor, cause the network device to determine a delay for the terminal device to establish the connection, based on a condition as to whether the target cell and a transmit beam of the target cell for the terminal device are known to the terminal device. The at least one memory and the computer program code are also configured to, with the at least one processor, cause the network device to monitor whether the terminal device establishes the connection within the delay.

In a fifth aspect, there is provided an apparatus for communication. The apparatus comprises means for receiving, at a terminal device, from a network device an indication for the terminal device to establish a connection with a target cell. The apparatus also comprises means for determining a condition as to whether the target cell and a transmit beam of the target cell for the terminal device are known to the terminal device. The apparatus also comprises means for determining, based on the condition, a delay for the terminal device to establish the connection. The apparatus further comprises means for establishing the connection within the delay.

In a sixth aspect, there is provided an apparatus for communication. The apparatus comprises means for transmitting, from a network device, to a terminal device an indication for the terminal device to establish a connection with a target cell. The apparatus also comprises means for determining a delay for the terminal device to establish the connection, based on a condition as to whether the target cell and a transmit beam of the target cell for the terminal device are known to the terminal device. The apparatus further comprises means for monitoring whether the terminal device establishes the connection within the delay.

In a seventh aspect, there is provided a non-transitory computer readable medium. The computer readable medium comprises program instructions for causing an apparatus to perform the method according to the first aspect.

In an eighth aspect, there is provided a non-transitory computer readable medium. The computer readable medium comprises program instructions for causing an apparatus to perform the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Figure 1:
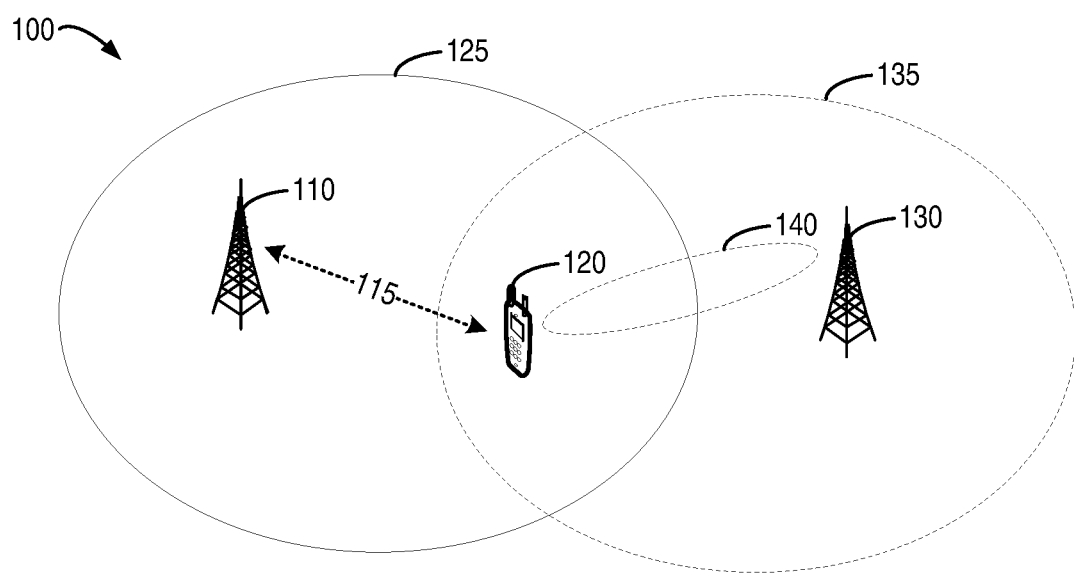
FIG. 1 is a schematic diagram of a communication environment in which embodiments of the present disclosure can be implemented.

Principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" and so on may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "has," "having," "includes" and/or "including," when used herein, specify the presence of stated features, elements, and/or components etc., but do not preclude the presence or addition of one or more other features, elements, components and/or combinations thereof.

The term "circuitry" used herein may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor (s), that requires software (for example, firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. In addition, the communication network may also refer to a so called Unlicensed Band Network, Licensed Band Network or MuLTEfire Network, or the like. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, self-driving cars, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "terminal device," "communication device," "terminal," "user equipment" and "UE" may be used interchangeably.

FIG. 1 is a schematic diagram of a communication environment (system) 100 in which embodiments of the present disclosure can be implemented. The communication environment 100 may comprise a network device 110, which provides wireless connection for a terminal device 120 within its coverage 125, also referred to as a serving cell 125. The terminal device 120 may communicate with the network device 110 via a communication channel such as a wireless channel 115.

For transmissions from the network device 110 to the terminal device 120, the communication channel 115 may be referred to as a downlink channel, whereas for transmissions from the terminal device 120 to the network device 110, the communication channel 115 may alternatively be referred to as an uplink channel. Additionally, the terminal device 120 may communicate with other terminal devices (not shown in FIG. 1) via device-to-device (D2D) links or communicate with the network device 110 or other terminal devices via relay type links (not shown in FIG. 1).

It is to be understood that the number of network devices and the number of terminal devices as shown in FIG. 1 are only for the purpose of illustration without suggesting any limitations. The communication environment 100 may include any suitable number of network devices and any suitable number of terminal devices adapted for implementing embodiments of the present disclosure. In addition, it would be appreciated that there may be various wireless communications as well as wireline communications (if needed) among these network devices and terminal devices.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future.

Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

As shown in FIG. 1, the terminal device 120 is also located in a cell 135 of a network device 130. Thus, the terminal device 120 may establish a connection with the cell 135 and then perform communications through the cell 135, for example, instead of or together with the cell 125 to improve communication performance of the terminal device 120. As an example, the terminal device 120 may be handed over from the serving cell 125 to the cell 135. In another example, the network device 110 and the terminal device 120 may activate the cell 135 as a secondary cell for carrier aggregation, together with the serving cell 125 as a primary cell. In a further example, the network device 110 and the terminal device 120 may configure the cell 135 as a primary secondary cell for dual connectivity, together with the serving cell 125 as a primary cell. In these three example scenarios, the cell 135 may also be referred to as a target cell.

It is to be understood that although in FIG. 1 the target cell 135 is shown to be associated with the network device 130 other than the network device 110, the target cell 135 may also be associated with the network device 110. For example, in case that the serving cell 125 and the target cell 135 are aggregated for carrier aggregation, the serving cell 125 and the target cell 135 may belong to a same network device or two different network devices. In the following, the target cell 135 is described as associated with the network device 130 without loss of generality. However, embodiments of the present application are equally applicable to the case that both the serving cell 125 and the target cell 135 are associated with a same network device.

Additionally, it is to be understood that the three example scenarios described above are only for example without suggesting any limitations. In other embodiments, the terminal device 120 may establish a connection with the target cell 135 for any other suitable existing functions or any other possible functions to be developed in future. In other words, embodiments of the present application are equally applicable to any communication scenario where the terminal device 120 establishes a connection with the target cell 135.

As described above, a condition for a known cell without beamforming has been defined in current 3GPP specifications. In particular, for a scenario of handover, the requirements or conditions for a cell to be considered as a known cell in frequency range 1 (FR1) as defined in TS 38.104 are defined in TS 38.133 as follows. In an interruption requirement, a cell is known if it has been meeting a relevant cell identification requirement during the last 5 seconds. Otherwise a cell is unknown. The relevant cell identification requirements are described in clause 9.2.5 of TS 38.133 for intra-frequency handover and clause 9.3.1 of TS 38.133 for inter-frequency handover.

In addition, for SCell activation delay, the requirement for a known FR1 cell is also defined in TS 38.133. A SCell in FR1 is known if it has been meeting the following conditions. During the period equal to max([5] measCycleSCell, [5] DRX cycles) for FR1 before the reception of the SCell activation command, the UE has sent a valid measurement report for the SCell being activated and the SSB measured remains detectable according to the cell identification conditions specified in section 9.2 and 9.3 of TS 38.133. In the meanwhile, the SSB measured during the period equal to max([5] measCycleSCell, [5] DRX cycles) also remains detectable during the SCell activation delay according to the cell identification conditions specified in section 9.2 and 9.3 of TS 38.133. Otherwise a SCell in FR1 is unknown. In the above definition, the notations "measCycleSCell," "DRX cycles," and "SSB" are defined in the 3GPP specifications, such as TS 38.311.

Further, for PSCell addition delay, the requirement for a known FR1 cell is defined in TS 36.133. In FR1, an NR PSCell is known if it has been meeting the following conditions. During the last 5 seconds before the reception of the NR PSCell configuration command, the UE has sent a valid measurement report for the NR PSCell being configured and one of the SSBs measured from the NR PSCell being configured remains detectable according to the cell identification conditions specified in section 9.3 of TS 38.133. In the meanwhile, one of the SSBs measured from NR PSCell being configured also remains detectable during the NR PSCell configuration delay according to the cell identification conditions specified in section 9.3 of TS 38.133. Otherwise an NR PSCell is unknown. In the above definition, the notation "SSB" is defined in the 3GPP specifications, such as TS 38.311.

More specifically, the requirement using known and unknown cell condition for example for the scenario of handover is then defined for NR in TS 38.133 as follows. $T_{search}$ is the time required to search the target cell when the target cell is not already known when the handover command is received by the UE. If the target cell is known, then $T_{search}=0$ ms. If the target cell is an unknown intra-frequency cell and for the target cell Es/Iot≥−TBD dB, then $T_{search}=T_{rs}+2$ ms. If the target cell is an unknown inter-frequency cell and the target cell Es/Iot≥−TBD dB, then $T_{search}=[3*T_{rs}+2]$ ms. Regardless of whether DRX is in use by the UE, $T_{search}$ shall still be based on non-DRX target cell search times.

In the above definition, $T_{rs}$ is the SMTC periodicity of the target NR cell if the UE has been provided with an SMTC configuration for the target cell in the handover command, otherwise $T_{rs}$ is the SMTC configured in the measObjectNR having the same SSB frequency and subcarrier spacing. If the UE is not provided SMTC configuration or measurement object on this frequency, the requirement in this section is applied with Trs=[5] ms assuming the SSB transmission periodicity is 5 ms. There are no requirements if the SSB transmission periodicity is not 5 ms. In addition, the notations "Es/Iot," "SMTC," "measObjectNR," "SSB" are defined in the 3GPP specifications, such as TS 38.311. The notation "TBD" represents "to be determined."

However, existing definitions in various scenarios for a known cell do not take into account transmit beamforming of the network device or receive beamforming of the terminal device. That is, there is no feasible definition for a known cell if either or both of the network device and the terminal device are capable of beamforming. For example, regarding FR2 cell as defined in TS 38.104, conditions for known and unknown cells have not been defined for any of the abovementioned cases (that is, target handover, HO, cell, SCell and PSCell), and hence known and unknown cells are not distinguished for FR2.

The reason is that when operating in FR2 the common understanding is that both the network device and the terminal device need to apply beamforming. That is, the terminal device can apply receive beamforming and the network device can apply transmit beamforming. Due to the transmit beamforming, the receive beamforming, and the need for SSB sweeping, there are some opinions that a similar known cell condition as for FR1 is not feasible.

The problem with defining a simple solution for example in FR2 as for FR1 cells is that the receive beamforming of the terminal device may lead to that the receive beam on terminal device side changes for example since reporting a cell and until the cell is for example HO target. Additionally, the transmit beam of the network device may change for example due to movement of the terminal device, meanwhile the cell may remain the same during the period between reporting and usage (for example as HO target), namely, when the cell condition has to be known on UE and network side.

According to UE vendors, a change in the receive beam and/or the transmit beam may lead to a need for beam sweeping. This is why a feasible method with predictable conditions under transmit beamforming or receive beamforming would need to be defined with these details taken into account. However, if a condition similar to the condition of known cell can be defined in case of beamforming, the communication performance of a terminal device would be improved, for example, the communication delay of the terminal device could be reduced. Therefore, there is a need for a method to define a cell as known in case of beamforming in a way that can be predictable and known for both a terminal device and a network device.

In view of the above, embodiments of the present disclosure provide a solution related to a known cell definition with beamforming. The embodiments of the present disclosure propose a number of alternatives on how to define a known cell condition for a terminal device (for example, in FR2) taking into account possible receive beamforming of the terminal device and transmit beamforming of the network device.

In some embodiments, cell conditions (and related UE delay requirements) are divided into three categories: "known cell and beam", "known cell and unknown beam" and "unknown cell." The delay requirements for each of these conditions may be defined respectively. With the embodiments of the present disclosure, communication performance of a terminal device can be improved. For example, communication delay of the terminal device can be reduced. In the following, some embodiments of the present disclosure will be detailed with reference to FIGS. 2-4.

Figure 2:
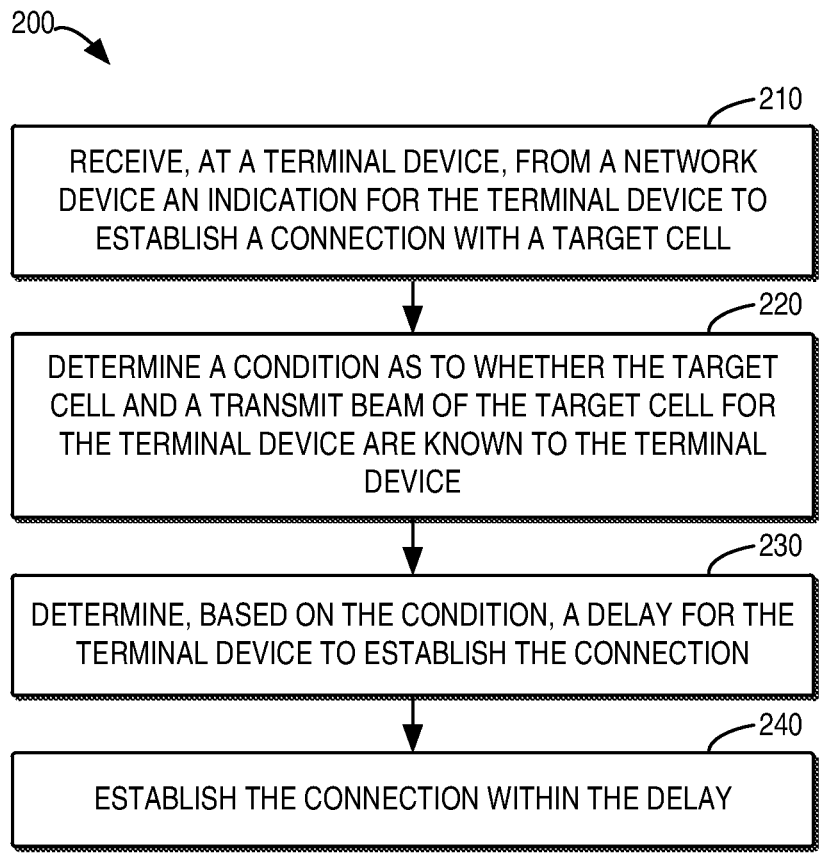
FIG. 2 shows a flowchart of an example method in accordance with some embodiments of the present disclosure.

FIG. 2 shows a flowchart of an example method 200 in accordance with some embodiments of the present disclosure. The method 200 can be implemented at a terminal device, such as the terminal device 120 as shown in FIG. 1. Additionally or alternatively, the method 200 can also be implemented at other terminal devices not shown in FIG. 1. For the purpose of discussion, the method 200 will be described with reference to FIG. 1 as being performed by the terminal device 120 without loss of generality.

At block 210, the terminal device 120 receives, from the network device 110, an indication for the terminal device 120 to establish a connection with the target cell 135. For ease of discussion, the indication may be referred to as "connecting indication" in the following. As shown in FIG.

1, the terminal device 120 is located in the coverage of the serving cell 115 and thus served by the network device 110. In the meanwhile, the terminal device 120 is also located in the coverage of the target cell 135 of the network device 130. In this event, the network device 110 serving the terminal device 120 may have information that the terminal device 120 is also located in the target cell 135 in addition to the serving cell 125, and thus there is a possibility to employ the target cell 135 for providing communication enhancement to the terminal device 120.

For example, the terminal device 120 may detect the existence of the target cell 135 and then report the target cell 135 to the network device 110. Additionally or alternatively, the network device 110 may determine the existence of the target cell 135 by itself, for example, based on some predetermined information, such as information of neighboring network devices adjacent to the network device 110. In both cases, in order to provide better communication performance to the terminal device 120, the network device 110 may transmit the connecting indication to the terminal device 120 for establishing a connection with the target cell 135.

At block 220, the terminal device 120 determines a condition as to whether the target cell 135 and a transmit beam 140 of the target cell 135 for the terminal device 120 are known to the terminal device 120. As used herein, a known cell for the terminal device 120 may mean that the terminal device 120 measured and reported the cell to the network device 110 before the terminal device 120 receives a connecting indication from the network device 110, and the cell remains unchanged when the terminal device 120 receives the connecting indication. Similarly, a known transmit beam for the terminal device 120 may mean that the terminal device 120 measured and reported the transmit beam to the network device 110 before the terminal device 120 receives the connecting indication, and the transmit beam remains unchanged when the terminal device 120 receives the connecting indication.

In other words, in some embodiments, the terminal device 120 may transmit, to the network device 110, a measurement report for the target cell 135 during a predetermined period prior to receiving the connecting indication from the network device 110. The duration of the predetermined period may be configured based on performance requirements and design parameters of the communication system 100. In case that the terminal device 120 transmitted the measurement report before the reception of the connecting indication, there is a possibility that the target cell 135 and the transmit beam 140 are still known to the terminal device 120 at the time when the terminal device 120 receives the connecting indication. In contrast, if the terminal device 120 does not transmit, to the network device 110, the measurement report for the target cell 135 during the predetermined period prior to receiving the connecting indication from the network device 110, then the target cell 135 and the transmit beam 140 are unknown to the terminal device 120.

As described above, in some embodiments, both the network device 130 and the terminal device 120 may apply beamforming in the communication to be performed between them, such as, in the FR2 as defined in TS 38.104. For example, when transmitting a signal to terminal device 120, the network device 130 may use a transmit beam 140 towards the terminal device 120, so as to increase the transmitting power directed to the terminal device 120. Similarly, when receiving the signal from the network device 130, the terminal device 120 may use a receive beam (not shown in FIG. 1) corresponding to the transmit beam 140, so as to increase the received power in the direction of the network device 130.

However, the receive beam of the terminal device 120 may change from a first instant when the terminal device 120 reports the target cell 135 to the network device 110 to a second instant when the terminal device 120 receives the connecting indication. Additionally, the transmit beam 140 of the network device 130 may also change from the first instant to the second instant, for example, due to movement of the terminal device 120. In the meanwhile, the target cell 135 may remain unchanged for the terminal device 120 during the duration from reporting the target cell 135 to using the target cell 135 (for example, as a handover target), namely, the time when the cell condition of the target cell 135 has to be known to the terminal device 120 and the network device 110. Accordingly, if the network device 110 and the terminal device 120 are capable of beamforming, it is insufficient that only the target cell 135 is known to the terminal device 120 for configuring delays for the terminal device 120 to establish the connection with the target cell 135.

In addition, it is noted that the control of the receive beam of the terminal device 120 is specific to the implementation of the terminal device 120 and any change in the receive beam is not controllable by the network device 110. Thus, in some embodiments, the change in the receive beam may not be considered in determining the condition for the terminal device 120 to establish the connection with the target cell 135, and thus may not be directly included in the respective delay requirements for different conditions. However, because the receive beam may change from the first instant to the second instant in various scenarios and cannot be directly tested from a perspective of the network device 110, in some embodiments the change in the receive beam of the terminal device 120 may be included into the delay requirements of different scenarios in a generic manner.

Therefore, in determining the condition for the terminal device 120 to establish the connection with the target cell 135, some different scenarios may be defined based on whether the target cell 135 and the transmit beam 140 are known to the terminal device 120. Accordingly, a first scenario may be that both the target cell 135 and the transmit beam 140 remain unchanged for the terminal device 120 from the first instant to the second instant. The first scenario may also be called as "known cell and beam." A second scenario may be that the target cell 135 remains unchanged, but the transmit beam 140 has changed from the first instant to the second instant. The second scenario may also be called as "known cell and unknown beam." A third scenario may be that the target cell 135 has changed from the first instant to the second instant. The third scenario may also be called "unknown cell." In some embodiments, these three scenarios may be used for FR2 as defined in TS 38.104.

As an example, the first scenario may be defined as follows. If a cell identification requirement is fulfilled for the target cell 135 and the transmit beam 140 during the predetermined period prior to receiving the connecting indication from the network device 110, and the transmit beam 140 remains unchanged from transmission of the measurement report of the target cell 135 to receipt of the connecting indication, the terminal device 120 may determine the condition where the target cell 135 and the transmit beam 140 are known. In some embodiments, the relevant cell identification requirement may be one of various relevant cell identification requirements as defined in TS 38.133. In some other some embodiments, the relevant cell identification requirement may be any other suitable existing or future requirements for cell identification. In this way, the terminal device 120 can clearly and readily determine a scenario of "known cell and beam."

As another example, the second scenario may be defined as follows. If the cell identification requirement is fulfilled during the predetermined period for the target cell 135 and at least one transmit beam of the target cell 135, the transmit beam 140 changes from transmission of the measurement report to receipt of the connecting indication, and the changed transmit beam 140 is one of the at least one transmit beam, that is, the changed transmit beam 140 is a detected and reported beam, then the terminal device 120 may determine the condition where the target cell 135 is known and the transmit beam 140 is unknown. In this way, the terminal device 120 can clearly and readily determine a scenario of "known cell and unknown beam."

In particular, it is assumed that the terminal device 120 is to be handed over to the target cell 135. The target cell 135 may be considered as known if the terminal device 120 has met the relevant cell identification requirement during the last 5 seconds on the target cell 135. Otherwise the target cell 135 may be considered as unknown. The relevant cell identification requirements may be one of those described in clause 9.2.5 of TS 38.133 for intra-frequency handover and clause 9.3.1 of TS 38.133 for inter-frequency handover. In addition, the transmit beam 140 may be considered as known if during the last 5 seconds the terminal device 120 has met the relevant cell identification requirement on the transmit beam 140 and the transmit beam 140 remains unchanged.

At block 230, the terminal device 120 determines a delay for the terminal device 120 to establish the connection, based on the condition as to whether the target cell 135 and the transmit beam 140 are known to the terminal device 120. In some embodiments, if the target cell 135 and the transmit beam 140 are known to the terminal device 120, the terminal device 120 may determine a first delay without a detecting delay for detecting the target cell 135 and a sweeping delay for receive beam sweeping. In other words, for the scenario of known cell and known beam, it may be assumed that the target cell 135 remains detectable and the transmit beam 140 has not changed. Therefore, no cell detection and receive beam sweeping may be needed at the terminal device 120.

In some embodiments, if the target cell 135 is known and the transmit beam 140 is unknown, the terminal device 120 may determine a second delay greater than or equal to the first delay. In other words, for the scenario of known cell and unknown beam, it may be assumed that the target cell 135 remains detectable, but the transmit beam 140 is changed. Therefore, no cell detection is needed but receive beam sweeping may be needed at the terminal device 120. As such, the second delay for the scenario of "known cell and unknown beam" may be reasonably greater than the first delay for the scenario of "known cell and beam." In some embodiments, it is noted that the actual delay requirements for the terminal device 120 may depend not only on the above defined conditions but also on capability of the terminal device 120.

In particular, if the terminal device 120 has a plurality of receive beams, the terminal device 120 may obtain the second delay by increasing the first delay with the sweeping delay. That is, for a terminal device capable of multi-receive beam, the second delay may be determined as the first delay plus at least one measurement for receive beam sweeping. On the other hand, if the terminal device 120 has a single receive beam, the terminal device 120 may determine the second delay as equal to the first delay, for example, due to co-location assumption and thus no receive beam sweeping is needed at the terminal device 120. As such, the capability of the terminal device 120 is considered in determining the delay requirements.

In some other embodiments, if the target cell 135 is unknown, the terminal device 120 may determine a third delay greater than the second delay. For example, the terminal device 120 may obtain the third delay based on the detecting delay for detecting the target cell 135, the capability of the terminal device 120, or other related parameters, and any combination thereof. As such, the third delay may be determined more reasonably. Alternatively, the terminal device 120 may obtain the third delay by increasing the first delay or the second delay with a predetermined increment. In this way, the third delay for the scenario of "unknown cell" may be ensured to be greater than the first delay and second delay.

In some cases, for the scenario of unknown cell, it may be assumed that requirements are only defined when conditions of the target cell 135 and the transmit beam 140 are assumed being good (for example, the first attempt or −3 dB), and the allowed delay time may be equal to the defined delay for cell detection including index reading (possibly including one measurement round). Also, this delay requirement for the unknown cell could depend on the capability of the terminal device 120.

In particular, the delay (that is, the interruption requirement) for handover (value for $T_{search}$) can be defined as follows, for example. If the target cell 135 and the transmit beam 140 are known, then $T_{search}$ may be determined as 0 ms. If the target cell 135 is known but the transmit beam 140 is unknown, then $T_{search}$ may be determined as $x*T_{rs}$ ($x \geq 0$). If the target cell 135 is unknown and for the target cell 140, Es/Iot$\geq$−TBD dB, then $T_{search}=y*T_{rs}$ ($y \geq x$).

In addition, any possible change in the transmit beam 140 of the network device 130 and change in receive beam of the terminal device 120 can then be taken into account in the above determined delays by allowing necessary relaxation. That is, receive beam sweeping can be taken into account by allowing a greater delay than the case of known cell and known transmit beam.

At block 240, the terminal device 120 establishes the connection within the delay determined based on the condition as to whether the target cell 135 and the transmit beam 140 are known to the terminal device 120. For example, if both the target cell 135 and the transmit beam 140 are known to the terminal device 120, then the terminal device 120 may try to establish the connection with the target cell 135 within the first delay without the detecting delay and the sweeping delay, so as to minimize the communication delay of the terminal device 120.

Alternatively, if the target cell 135 is known to the terminal device 120 and the transmit beam 140 is unknown to the terminal device 120, then the terminal device 120 may attempt to establish the connection with the target cell 135 within the second delay greater than or equal to the first delay, so as to minimize the communication delay of the terminal device 120. Further, if the target cell 135 is unknown to the terminal device 120, then the terminal device 120 may endeavor to establish the connection with the target cell 135 within the third delay greater than the second delay. In contrast, if the terminal device 120 fails to establish the connection within the respective determined delays in various scenarios, the terminal device 120 may consider the establishment of the connection as unsuccessful and may retry or abandon the establishment.

In some embodiments, the terminal device 120 may establish the connection with the target cell 135 for various purposes. In one potential purpose, the terminal device 120 may be handed from the serving cell 125 over to the target cell 135. In another potential purpose, the target cell 135 may be activated the terminal device 120 as a secondary cell for carrier aggregation, together with the serving cell 125 as a primary cell. In a further potential purpose, the target cell 135 may be configured for the terminal device 120 as a primary secondary cell for dual connectivity, in conjunction with the serving cell 125 as a primary cell. It is to be understood that the terminal device 120 may establish the connection with the target cell 135 for any other suitable existing functions or possible functions to be developed in future.

Figure 3:
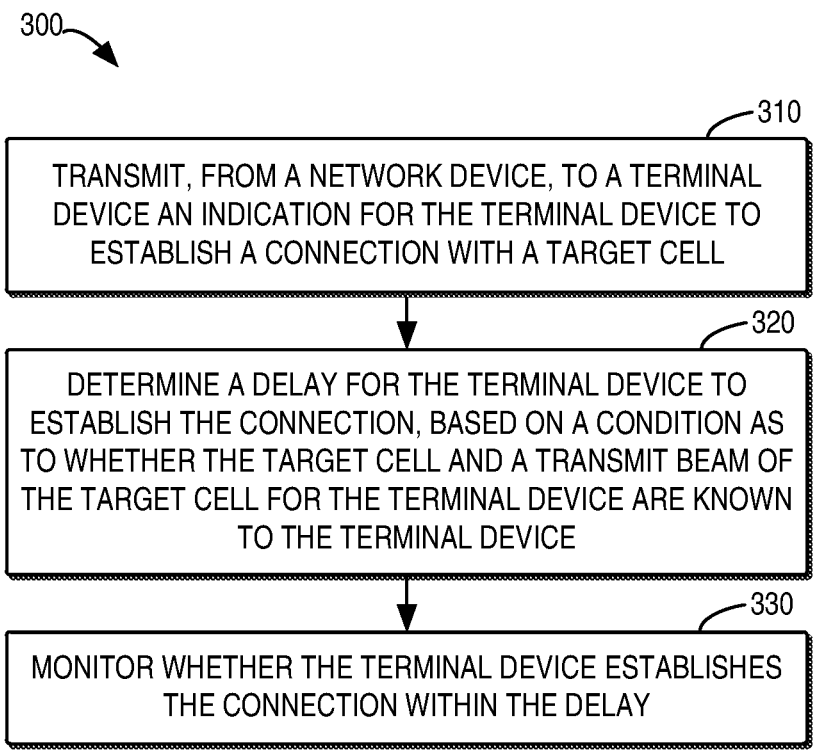
FIG. 3 shows a flowchart of another example method in accordance with some embodiments of the present disclosure.

FIG. 3 shows a flowchart of another example method 300 in accordance with some embodiments of the present disclosure. The method 300 can be implemented at a network device, such as the network device 110 as shown in FIG. 1. Additionally or alternatively, the method 300 can also be implemented at the network device 130 and other network devices not shown in FIG. 1. For the purpose of discussion, the method 300 will be described with reference to FIG. 1 as being performed by the network device 110 without loss of generality. In addition, it is appreciated that the method 300 may be performed by the network device 110 in a manner corresponding to that the terminal device performs the method 200. Therefore, the method 300 may be understood with reference to the method 200 and may not be described in detail in the following.

At block 310, the network device 110 transmits to the terminal device 120 an indication for the terminal device to establish a connection with a target cell. As an example, the network device 110 may transmit an indication to hand the terminal device 120 over to the target cell 135. As another example, the network device 110 may transmit an indication to activate the target cell 135 as a secondary cell for carrier aggregation. As a further example, the network device 110 may transmit an indication to configure the target cell 135 as a primary secondary cell for dual connectivity. It is to be understood that the network device 110 may indicate the terminal device 120 to establish the connection with the target cell 135 for any other suitable existing functions or possible functions to be developed in future.

At block 320, the network device 110 determines a delay for the terminal device 120 to establish the connection, based on a condition as to whether the target cell 135 and a transmit beam 140 of the target cell 135 for the terminal device 120 are known to the terminal device 120. In some embodiments, during a predetermined period prior to transmitting the indication, the network device 110 may receive, from the terminal device 120, a measurement report for the target cell 135.

In some embodiments, the condition may comprise: if a cell identification requirement is fulfilled during the predetermined period for the target cell 135 and the transmit beam 140, and the transmit beam 140 remains unchanged from receipt of the measurement report to transmission of the indication, then the target cell 135 and the transmit beam 140 are known to the terminal device 120.

In some embodiments, the condition may comprise: if the cell identification requirement is fulfilled during the predetermined period for the target cell 135 and at least one transmit beam of the target cell 135, the transmit beam 140 changes from receipt of the measurement report to transmission of the indication, and the changed transmit beam is one of the at least one transmit beam, then the target cell 140 is known and the transmit beam is unknown to the terminal device 120.

In some embodiments, if the target cell 135 and the transmit beam 140 are known to the terminal device 120, the network device 110 may determine a first delay without a detecting delay for the terminal device 120 to detect the target cell 135 and a sweeping delay for the terminal device 120 to perform receive beam sweeping. If the target cell 135 is known and the transmit beam 140 is unknown to the terminal device 120, the network device 110 may determine a second delay greater than or equal to the first delay.

In some embodiments, if the terminal device 120 has a plurality of receive beams, the network device 110 may obtain the second delay by increasing the first delay with the sweeping delay. If the terminal device has a single receive beam, the network device 110 may determine the second delay as equal to the first delay.

If the target cell 135 is unknown to the terminal device 120, the network device 110 may determine a third delay greater than the second delay. In some embodiments, the network device 110 may obtain the third delay based on at least one of the detecting delay and capability of the terminal device. Alternatively or additionally, the network device 110 may obtain the third delay by increasing the first delay or the second delay with a predetermined increment.

At block 330, the network device 110 monitors whether the terminal device 120 establishes the connection within the delay. In some embodiments, in order to monitor the establishment of the connection, the network device 110 may configure a plurality of timers corresponding to respective delays for different conditions. For example, the network device 110 may set a first timer corresponding to the first delay for the condition where both the target cell 135 and the transmit beam 140 are known to the terminal device 120, a second timer corresponding to the second delay for the condition where the target cell 135 is known and the transmit beam 140 is unknown to the terminal device 120, and a third timer corresponding to the third delay for the condition where the target cell 135 is unknown to the terminal device 120.

If the network device 110 detects that the terminal device 120 establishes the connection within the respective determined delays in various scenarios, the network device 110 may perform a corresponding operation related to the target cell 135 for the terminal device 120, such as handing the terminal device 120 over to the target cell 135, activating the target cell 135 as a secondary cell for carrier aggregation, or configuring the target cell 135 as a primary secondary cell for dual connectivity, so as to minimize the communication delay of the terminal device 120.

If the network device 110 detects that the terminal device 120 fails to establish the connection within the respective determined delays in various scenarios, the network device 110 may consider the establishment of the connection as unsuccessful and may instruct the terminal device 120 to retry or abandon the establishment. Alternatively, if network device 110 detects that the terminal device 120 fails to establish the connection within the first delay, the network device 110 may wait for the terminal device 120 to establish the connection until the second delay and/or the third delay is exceeded.

In some embodiments, an apparatus for performing the method 200 (for example, the terminal device 120) may comprise respective means for performing the corresponding steps in the method 200. These means may be implemented in any suitable manners. For example, they can be implemented by circuitry or software modules or a combination thereof.

In some embodiments, the apparatus comprises: means for receiving, at a terminal device, from a network device an indication for the terminal device to establish a connection with a target cell; means for determining a condition as to whether the target cell and a transmit beam of the target cell for the terminal device are known to the terminal device; means for determining, based on the condition, a delay for the terminal device to establish the connection; and means for establishing the connection within the delay.

In some embodiments, the apparatus further comprises: means for transmitting, to the network device, a measurement report for the target cell during a predetermined period prior to receiving the indication.

In some embodiments, the means for determining the condition comprises: means for, in response to a determination that a cell identification requirement is fulfilled during the predetermined period for the target cell and the transmit beam and that the transmit beam remains unchanged from transmission of the measurement report to receipt of the indication, determining the condition where the target cell and the transmit beam are known.

In some embodiments, the means for determining the condition comprises: means for, in response to a determination that a cell identification requirement is fulfilled during the predetermined period for the target cell and at least one transmit beam of the target cell, that the transmit beam changes from transmission of the measurement report to receipt of the indication, and that the changed transmit beam is one of the at least one transmit beam, determining the condition where the target cell is known and the transmit beam is unknown.

In some embodiments, the means for determining the delay comprises: means for, in response to the condition where the target cell and the transmit beam are known, determining a first delay without a detecting delay for detecting the target cell and a sweeping delay for receive beam sweeping; means for, in response to the condition where the target cell is known and the transmit beam is unknown, determining a second delay greater than or equal to the first delay; and means for, in response to the condition where the target cell is unknown, determining a third delay greater than the second delay.

In some embodiments, the means for determining the second delay comprises: means for, in response to the terminal device having a plurality of receive beams, obtaining the second delay by increasing the first delay with the sweeping delay; and means for, in response to the terminal device having a single receive beam, determining the second delay as equal to the first delay.

In some embodiments, the means for determining the third delay comprises at least one of: means for obtaining the third delay based on at least one of the detecting delay and capability of the terminal device; and means for obtaining the third delay by increasing the first delay or the second delay with a predetermined increment.

In some embodiments, the means for establishing the connection comprises at least one of: means for handing over to the target cell; means for activating the target cell as a secondary cell for carrier aggregation; and means for configuring the target cell as a primary secondary cell for dual connectivity.

In some embodiments, an apparatus for performing the method 300 (for example, the network device 110) may comprise respective means for performing the corresponding steps in the method 300. These means may be implemented in any suitable manners. For example, they can be implemented by circuitry or software modules or a combination thereof.

In some embodiments, the apparatus comprises: means for transmitting, from a network device, to a terminal device an indication for the terminal device to establish a connection with a target cell; means for determining a delay for the terminal device to establish the connection, based on a condition as to whether the target cell and a transmit beam of the target cell for the terminal device are known to the terminal device; and means for monitoring whether the terminal device establishes the connection within the delay.

In some embodiments, the apparatus further comprises: means for receiving, from the terminal device, a measurement report for the target cell during a predetermined period prior to transmitting the indication.

In some embodiments, the condition comprises: if a cell identification requirement is fulfilled during the predetermined period for the target cell and the transmit beam, and the transmit beam remains unchanged from receipt of the measurement report to transmission of the indication, then the target cell and the transmit beam are known to the terminal device.

In some embodiments, the condition comprises: if a cell identification requirement is fulfilled during the predetermined period for the target cell and at least one transmit beam of the target cell, the transmit beam changes from receipt of the measurement report to transmission of the indication, and the changed transmit beam is one of the at least one transmit beam, then the target cell is known and the transmit beam is unknown to the terminal device.

In some embodiments, the means for determining the delay comprises: means for, in response to the condition where the target cell and the transmit beam are known to the terminal device, determining a first delay without a detecting delay for the terminal device to detect the target cell and a sweeping delay for the terminal device to perform receive beam sweeping; means for, in response to the condition where the target cell is known and the transmit beam is unknown to the terminal device, determining a second delay greater than or equal to the first delay; and means for in response to the condition where the target cell is unknown to the terminal device, determining a third delay greater than the second delay.

In some embodiments, the means for determining the second delay comprises: means for, in response to the terminal device having a plurality of receive beams, obtaining the second delay by increasing the first delay with the sweeping delay; and means for, in response to the terminal device having a single receive beam, determining the second delay as equal to the first delay.

In some embodiments, the means for determining the third delay comprises at least one of: means for obtaining the third delay based on at least one of the detecting delay and capability of the terminal device; and means for obtaining the third delay by increasing the first delay or the second delay with a predetermined increment.

In some embodiments, the means for transmitting the indication comprises at least one of: means for transmitting an indication to hand over to the target cell; means for transmitting an indication to activate the target cell as a secondary cell for carrier aggregation; and means for transmitting an indication to configure the target cell as a primary secondary cell for dual connectivity.

Figure 4:
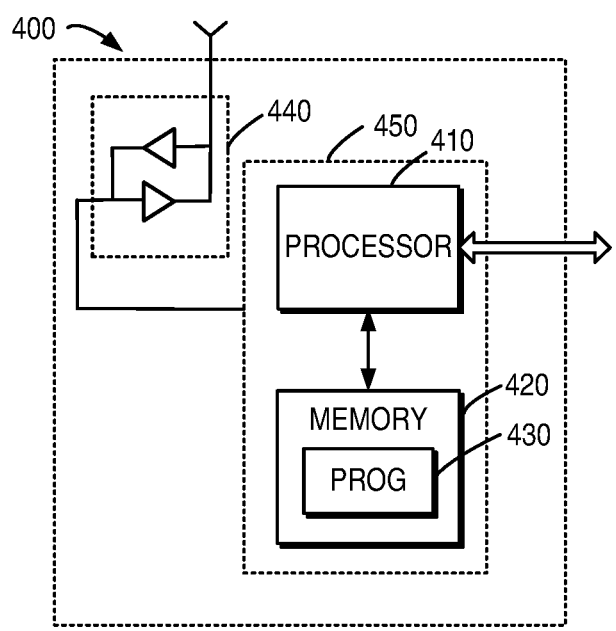
FIG. 4 is a simplified block diagram of a device that is suitable for implementing embodiments of the present disclosure.

FIG. 4 is a simplified block diagram of a device 400 that is suitable for implementing embodiments of the present disclosure. The device 400 can be considered as a further example embodiment of the network device 110 and the terminal device 120 as shown in FIG. 1. Accordingly, the device 400 can be implemented at or as at least a part of the network device 110 or the terminal device 120.

As shown, the device 400 includes a processor 410, a memory 420 coupled to the processor 410, a suitable transmitter (TX) and receiver (RX) 440 coupled to the processor 410, and a communication interface coupled to the TX/RX 440. The memory 420 stores at least a part of a program 430. The TX/RX 440 is for bidirectional communications. The TX/RX 440 has at least one antenna to facilitate communication. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 430 is assumed to include program instructions that, when executed by the associated processor 410, enable the device 400 to operate in accordance with the embodiments of the present disclosure, as discussed herein with reference to FIGS. 1 to 4. The embodiments herein may be implemented by computer software executable by the processor 410 of the device 400, or by hardware, or by a combination of software and hardware. The processor 410 may be configured to implement various embodiments of the present disclosure. Furthermore, a combination of the processor 410 and memory 420 may form processing means 450 adapted to implement various embodiments of the present disclosure.

The memory 420 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 420 is shown in the device 400, there may be several physically distinct memory modules in the device 400. The processor 410 may be of any type suitable to the local technical network, and may include one or more of general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 and 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

For the purpose of the present disclosure as described herein above, it should be noted that, method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (for example, devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (for example the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present disclosure is restricted thereto. Rather, it is the intention that all variations and modifications be included which fall within the spirit and scope of the appended claims.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for communication, comprising:
receiving, at a terminal device, from a network device an indication for the terminal device to activate a target cell in a frequency range 2;
determining a condition as to whether the target cell and a transmit beam of the target cell for the terminal device are known to the terminal device, wherein the determining the condition includes:
determining whether the terminal device has reported the transmit beam to the network device during a predetermined period prior to receiving the indication;
determining, based on the condition, a delay for the terminal device to activate the target cell; and
activating the target cell based on the delay.

2. The method of claim 1, further comprising:
transmitting, to the network device, a measurement report for the target cell during the predetermined period prior to receiving the indication.

3. The method of claim 2, wherein determining the condition comprises:
in response to a determination that a cell identification requirement is fulfilled during the predetermined period for the target cell and the transmit beam and that the transmit beam remains unchanged from transmission of the measurement report to receipt of the indication, determining the condition where the target cell and the transmit beam are known.

4. The method of claim 2, wherein determining the condition comprises:
in response to a determination that a cell identification requirement is fulfilled during the predetermined period for the target cell and at least one transmit beam of the target cell, that the transmit beam changes from transmission of the measurement report to receipt of the indication, and that the changed transmit beam is one of the at least one transmit beam, determining the condition where the target cell is known and the transmit beam is unknown.

5. The method of claim 1, wherein determining the delay comprises:
in response to the condition where the target cell and the transmit beam are known, determining a first delay without a detecting delay for detecting the target cell and a sweeping delay for receive beam sweeping;
in response to the condition where the target cell is known and the transmit beam is unknown, determining a second delay greater than or equal to the first delay; and
in response to the condition where the target cell is unknown, determining a third delay greater than the second delay.

6. The method of claim 5, wherein determining the second delay comprises:
   in response to the terminal device having a plurality of receive beams, obtaining the second delay by increasing the first delay with the sweeping delay; and
   in response to the terminal device having a single receive beam, determining the second delay as equal to the first delay.

7. The method of claim 5, wherein determining the third delay comprises at least one of:
   obtaining the third delay based on at least one of the detecting delay and capability of the terminal device; and
   obtaining the third delay by increasing the first delay or the second delay with a predetermined increment.

8. A terminal device, comprising:
   at least one processor; and
   at least one memory storing computer program instructions;
   the at least one memory and the computer program instructions configured to, with the at least one processor, cause the terminal device to:
      receive, from a network device, an indication for the terminal device to activate a target cell in a frequency range 2;
   determine a condition as to whether the target cell and a transmit beam of the target cell for the terminal device are known to the terminal device, wherein the determining the condition includes:
      determining whether the terminal device has reported the transmit beam to the network device during a predetermined period prior to receiving the indication;
   determine, based on the condition, a delay for the terminal device to activate the target cell; and
   activate the target cell based on the delay.

9. The terminal device of claim 8, wherein the at least one memory and the computer program instructions configured to, with the at least one processor, further cause the terminal device to:
   transmit, to the network device, a measurement report for the target cell during the predetermined period prior to receiving the indication.

10. The terminal device of claim 9, wherein the at least one memory and the computer program instructions configured to, with the at least one processor, further cause the terminal device to:
   in response to a determination that a cell identification requirement is fulfilled during the predetermined period for the target cell and the transmit beam and that the transmit beam remains unchanged from transmission of the measurement report to receipt of the indication, determine the condition where the target cell and the transmit beam are known.

11. The terminal device of claim 9, wherein the at least one memory and the computer program instructions configured to, with the at least one processor, further cause the terminal device to:
   in response to a determination that a cell identification requirement is fulfilled during the predetermined period for the target cell and at least one transmit beam of the target cell, that the transmit beam changes from transmission of the measurement report to receipt of the indication, and that the changed transmit beam is one of the at least one transmit beam, determine the condition where the target cell is known and the transmit beam is unknown.

12. The terminal device of claim 8, wherein the at least one memory and the computer program instructions configured to, with the at least one processor, further cause the terminal device to:
   in response to the condition where the target cell and the transmit beam are known, determine a first delay without a detecting delay for detecting the target cell and a sweeping delay for receive beam sweeping;
   in response to the condition where the target cell is known and the transmit beam is unknown, determine a second delay greater than or equal to the first delay; and
   in response to the condition where the target cell is unknown, determine a third delay greater than the second delay.

13. The terminal device of claim 12, wherein the at least one memory and the computer program instructions configured to, with the at least one processor, further cause the terminal device to:
   in response to the terminal device having a plurality of receive beams, obtain the second delay by increasing the first delay with the sweeping delay; and
   in response to the terminal device having a single receive beam, determine the second delay as equal to the first delay.

14. The terminal device of claim 12, wherein the at least one memory and the computer program instructions configured to, with the at least one processor, further cause the terminal device to at least one of:
   obtain the third delay based on at least one of the detecting delay and capability of the terminal device; and
   obtain the third delay by increasing the first delay or the second delay with a predetermined increment.

15. A non-transitory computer readable medium comprising program instructions for causing a terminal device to perform at least the following:
   receiving, at a terminal device, from a network device an indication for the terminal device to activate a target cell in a frequency range 2;
   determining a condition as to whether the target cell and a transmit beam of the target cell for the terminal device are known to the terminal device, wherein the determining the condition includes:
      determining whether the terminal device has reported the transmit beam to the network device during a predetermined period prior to receiving the indication;
   determining, based on the condition, a delay for the terminal device to activate the target cell; and
   activating the target cell based on the delay.

16. The non-transitory computer readable medium of claim 15, further causing the terminal device to perform:
   transmitting, from the terminal device, a measurement report for the target cell during the predetermined period prior to receiving the indication.

17. The non-transitory computer readable medium of claim 16, wherein the condition comprises:
   if a cell identification requirement is fulfilled during the predetermined period for the target cell and the transmit beam, and the transmit beam remains unchanged from transmission of the measurement report to receipt of the indication, then the target cell and the transmit beam are known to the terminal device.

18. The non-transitory computer readable medium of claim 16, wherein the condition comprises:
   if a cell identification requirement is fulfilled during the predetermined period for the target cell and at least one transmit beam of the target cell, the transmit beam changes from transmission of the measurement report to receipt of the indication, and the changed transmit beam is one of the at least one transmit beam, then the target cell is known and the transmit beam is unknown to the terminal device.

19. The non-transitory computer readable medium of claim 15, wherein determining the delay comprises:
- in response to the condition where the target cell and the transmit beam are known to the terminal device, determining a first delay without a detecting delay for the terminal device to detect the target cell and a sweeping delay for the terminal device to perform receive beam sweeping;
- in response to the condition where the target cell is known and the transmit beam is unknown to the terminal device, determining a second delay greater than or equal to the first delay; and
- in response to the condition where the target cell is unknown to the terminal device, determining a third delay greater than the second delay.

20. The non-transitory computer readable medium of claim 19, wherein determining the second delay comprises:
- in response to the terminal device having a plurality of receive beams, obtaining the second delay by increasing the first delay with the sweeping delay; and
- in response to the terminal device having a single receive beam, determining the second delay as equal to the first delay.

* * * * *